United States Patent
Lotlikar et al.

(10) Patent No.: US 12,468,629 B1
(45) Date of Patent: Nov. 11, 2025

(54) SNOOP FILTER SHARER VECTOR EXPANSION

(71) Applicant: Baya Systems, Inc., Santa Clara, CA (US)

(72) Inventors: Swapnil Lotlikar, San Jose, CA (US); Joji Philip, San Jose, CA (US); James Aldis, England (GB)

(73) Assignee: Baya Systems, Inc., Santa Clara, CA (US)

( * ) Notice: Subject to any disclaimer, the term of this patent is extended or adjusted under 35 U.S.C. 154(b) by 0 days.

(21) Appl. No.: 18/750,570

(22) Filed: Jun. 21, 2024

(51) Int. Cl.
*G06F 12/0815* (2016.01)

(52) U.S. Cl.
CPC ................ *G06F 12/0815* (2013.01)

(58) Field of Classification Search
None
See application file for complete search history.

(56) References Cited

U.S. PATENT DOCUMENTS

| | | | | |
|---|---|---|---|---|
| 7,475,321 | B2 * | 1/2009 | Gurumurthi | G06F 11/0724 |
| | | | | 711/155 |
| 9,892,803 | B2 * | 2/2018 | Reed | G06F 12/0811 |
| 11,249,908 | B1 * | 2/2022 | Jahren | G06F 9/546 |
| 2004/0039880 | A1 * | 2/2004 | Pentkovski | G06F 12/0811 |
| | | | | 711/146 |
| 2006/0143406 | A1 * | 6/2006 | Chrysos | G06F 12/0811 |
| | | | | 711/143 |
| 2006/0156155 | A1 * | 7/2006 | Gurumurthi | G06F 11/0793 |
| | | | | 714/746 |
| 2007/0186044 | A1 * | 8/2007 | Fowles | G06F 12/0806 |
| | | | | 711/130 |
| 2008/0040555 | A1 * | 2/2008 | Iyer | G06F 12/0811 |
| | | | | 711/E12.024 |
| 2010/0146209 | A1 * | 6/2010 | Burger | G06F 12/0813 |
| | | | | 711/120 |
| 2012/0173819 | A1 * | 7/2012 | Solihin | G06F 12/0806 |
| | | | | 711/119 |
| 2012/0246446 | A1 * | 9/2012 | Solihin | G06F 9/3802 |
| | | | | 712/205 |
| 2014/0032848 | A1 * | 1/2014 | Zhao | G06F 12/0826 |
| | | | | 711/130 |
| 2015/0324288 | A1 * | 11/2015 | Rowlands | G06F 12/0833 |
| | | | | 711/146 |
| 2017/0168939 | A1 * | 6/2017 | Jalal | G06F 12/0815 |
| 2019/0073304 | A1 * | 3/2019 | Jiang | G06F 12/0831 |

FOREIGN PATENT DOCUMENTS

| | | | | | |
|---|---|---|---|---|---|
| CN | 104408069 | A | * | 3/2015 | ......... G06F 16/1847 |
| GB | 2441435 | A | * | 3/2008 | ......... G06F 12/0817 |
| WO | WO-2017023252 | A1 | * | 2/2017 | ......... G06F 12/1458 |

* cited by examiner

*Primary Examiner* — Christopher D Birkhimer
(74) *Attorney, Agent, or Firm* — Procopio, Cory, Hargreaves & Savitch LLP

(57) ABSTRACT

A method for a snoop filter includes using binary encodings and vector encodings to represent owner and sharers of cache lines of a cache. The vector encodings can be split across the multiple ways of the snoop filter via a vector range identifier and a common tag. Further, only vector ranges having at least one sharer from the sharers are allocated a way from the multiple ways.

10 Claims, 8 Drawing Sheets

Single Cache

Single Cache

FIG. 1(a)

Three-Level Cache Organization

SNOOP FILTER SHARER VECTOR EXPANSION

BACKGROUND

Technical Field

Methods and example implementations described herein are generally directed to cache coherency management, and more specifically, to the use of multiple directory ways sharing the same tag and using a mixed representations of sharers between binary encoding and vector encoding.

Related Art

In related art computer systems, instructions and data were stored and fetched from a main storage by a memory management system for execution or use by a central processor unit, or possibly by some special function unit, such as a floating-point processor. In a few systems, some instructions and data may be retained after their use in a cache memory, which can be accessed more quickly than the main storage. As a result, such instructions and data can be reused later in the execution of the same program. This related art scheme improves the execution performance of the computer system by reducing the time taken to fetch the instructions and data for processing by the central processing unit.

In related art computer systems that have cache memories, the number of cycles required to retrieve an instruction or a data item depends on whether the data item is already in the cache or not, and on how many instructions are required to address or retrieve the data item. If the data item is not in the cache (e.g., a "cache miss"), the instruction or data item must be fetched from main memory, which consumes some number of instruction cycles. If the data item is in the cache, some instruction cycles will also be consumed, although the consumed instruction cycles will be fewer than in the case of a cache miss. Nevertheless, any improvement that can be made in the processing of cached data and instructions is useful. In certain circumstances, the improvement may make a considerable difference to the processing performance of the system.

Figure 1A:
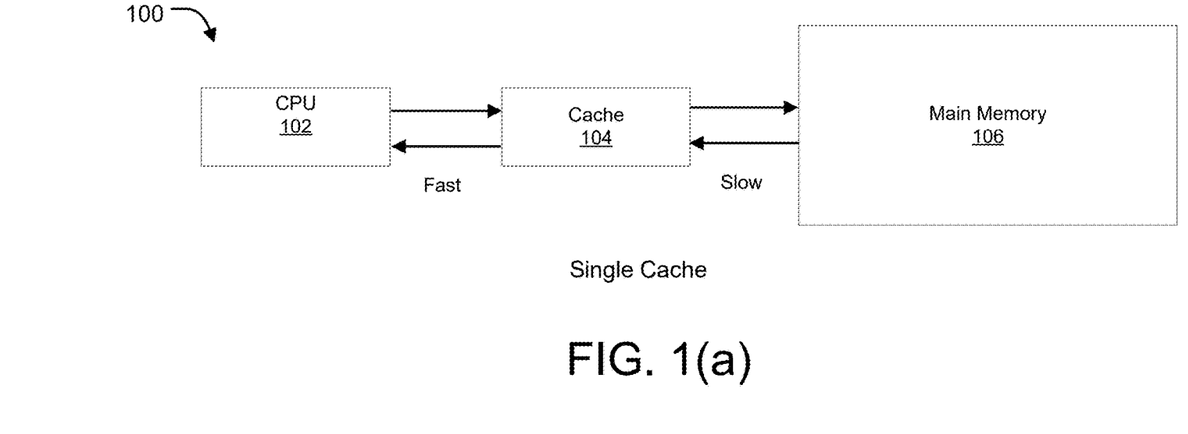
FIG. 1(a) and FIG. 1(b) illustrate example cache memory architectures, respectively, showing placement of cache memory in a hardware layout.
Figure 1B:
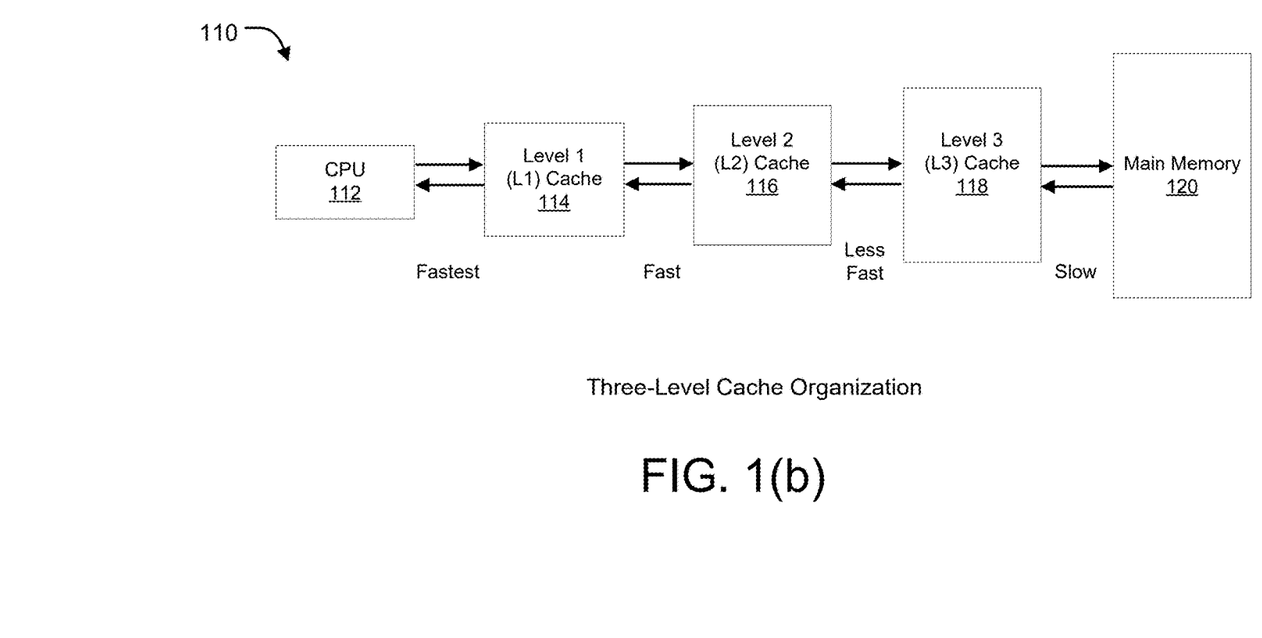

FIG. 1(a) and FIG. 1(b) illustrate cache memory architectures 100 and 110 respectively, showing placement of cache memory in the hardware layout. As illustrated, cache 104 is positioned between Central Processing Unit (CPU) 102 and main memory 106. Data block access from the cache 104 is faster when compared with access of the same data block from the main memory 106, since the cache 104 maintains at least a subset of data stored in the main memory 106 and hence requires fewer instruction cycles. Similarly, FIG. 1(b) illustrates multiple caches 114, 116, and 118 configured between CPU 112 and main memory 120.

Most related caching techniques have a fundamental tradeoff between cache latency and hit rate, where larger caches have better hit rates but longer latency. To address this tradeoff, many computers use multiple levels of cache, with small fast caches backed up by larger, slower caches. Multi-level cache systems generally operate by checking the smallest level 1 (L1) cache 114 first. If a hit occurs in L1, the processor proceeds at high speed. If the smaller cache misses, the next larger cache 116 (L2) is checked, and so on to L3 cache such as 118, before external/main memory 120 is checked. The latency increases incrementally as higher levels of cache are checked. Throughout the specification, caches at levels higher thereto are referred to as higher-level caches (for example, L4 is a higher-level cache with respect to L3), and caches at levels lower thereto are referred to as lower-level caches (for example L2 and L1 are lower-level caches with respect to L3).

Figure 2A:
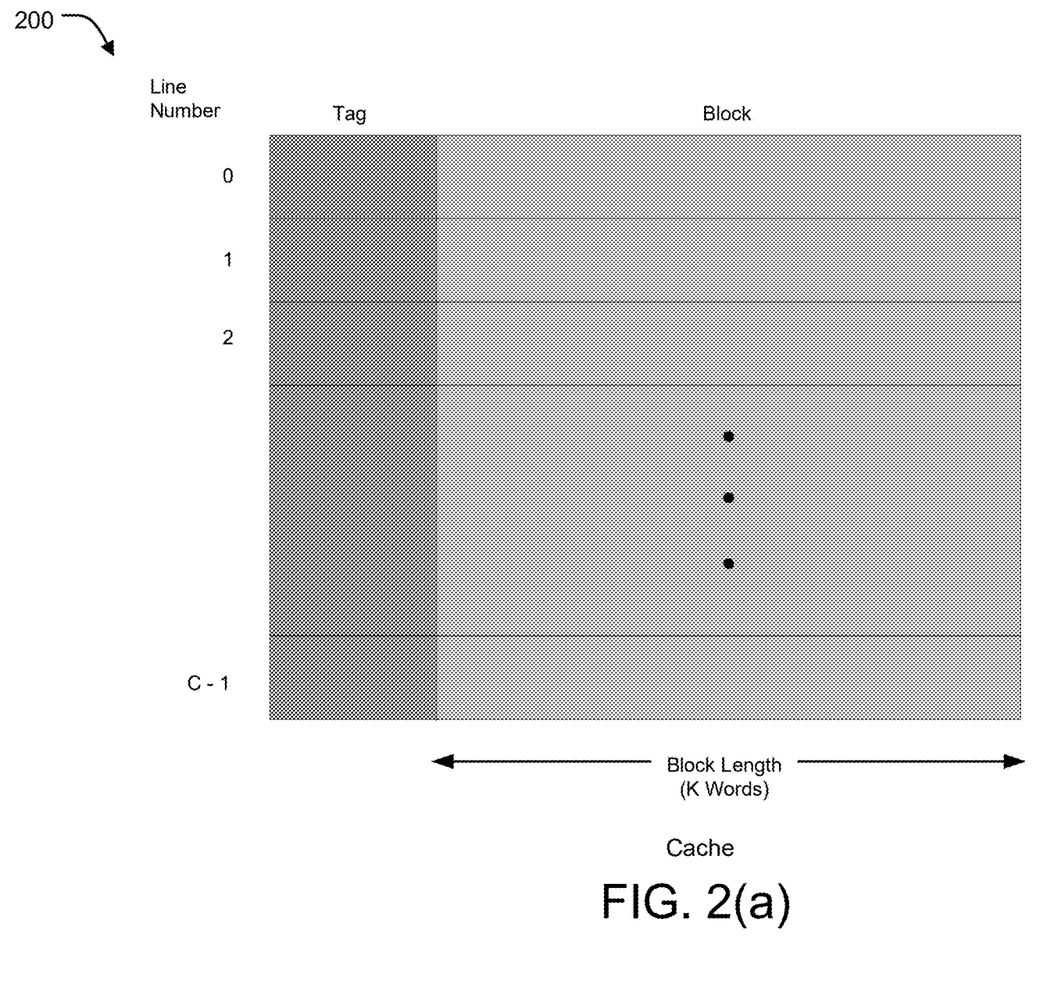
FIG. 2(a) illustrates structural layout of cache memory.
Figure 2B:
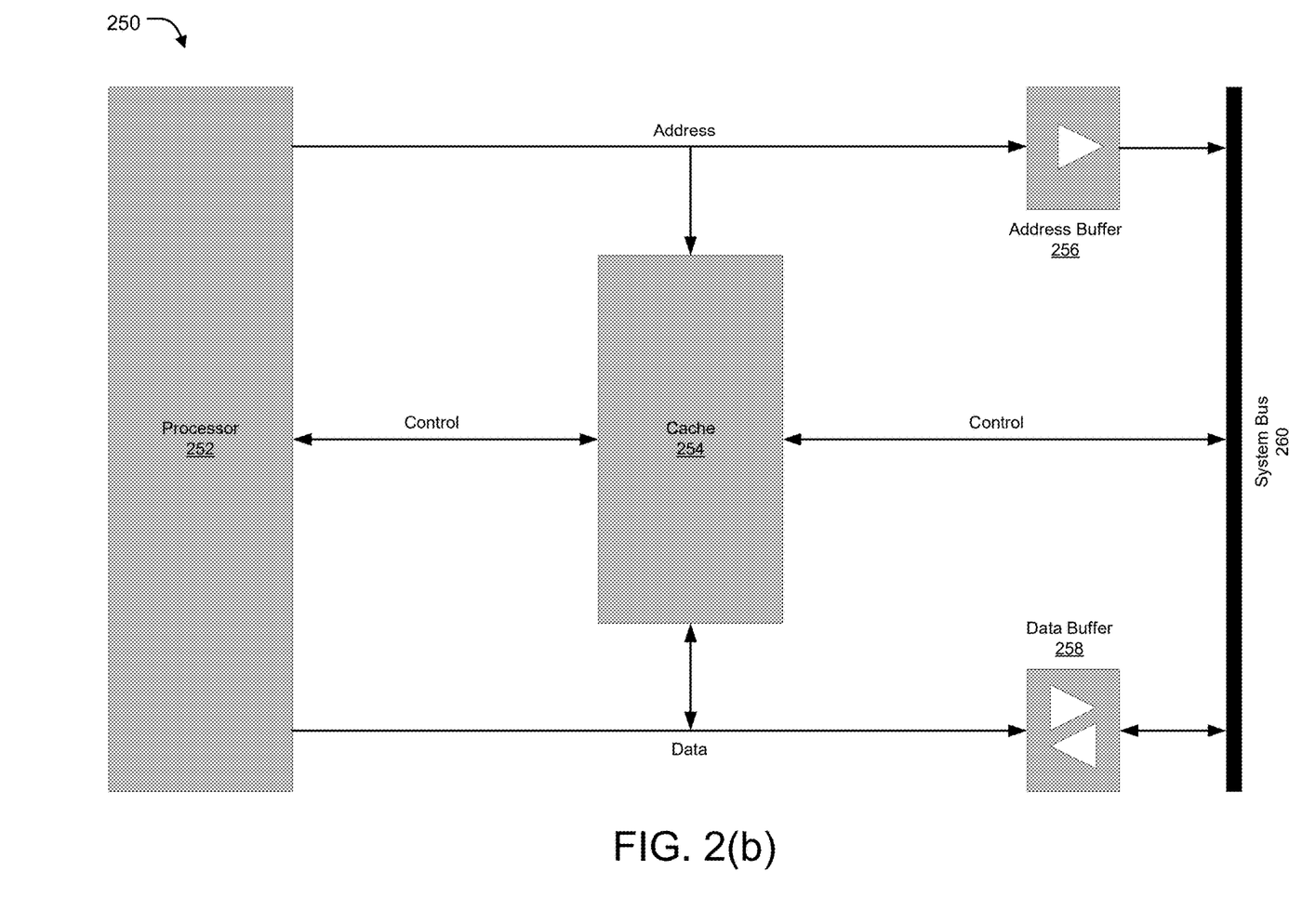
FIG. 2(b) illustrates interactions between processor and cache through address and data lines.

FIG. 2(a) illustrates a structural layout of a cache 200. Each cache 200 may include one or more ways. As illustrated, each way includes a plurality of cache lines, each having a block with K words that store data from the memory. Each cache line also includes a tag that identifies the block being stored. The tag stores an address, which may be a pointer to the location of the blocks/data in the memory. The cache 200 includes C blocks/cache lines (numbered from 0 to C−1), which is less than the number of blocks, say M, of the main memory. FIG. 2(b) illustrates architectural layout of interactions 250 between cache 254, processor 252, and system bus 260 through address buffer 256 and data buffer 258. As represented, the processor 252 sends address level instructions to the cache 254 to identify the location of data block that is to be fetched along with issuing data requests to the cache 254. Address information paths are provided between the processor 252, cache 254, and address buffer 256, whereas data information paths are provided between the processor 252, cache 254, and data buffer 258. The cache 254, address buffer 256, and data buffer 258, all interact through the system bus 260 to receive data blocks and interact with the main memory (not shown).

Typically, a cache is divided into a number of sets of cache lines, where each set includes a fixed number of lines. A data block from main memory can be configured to map to any line in a given set determined by the respective block address. For instance, in case there are "m" number of lines in the cache, "v" number of sets, and "k" number of lines per set, the value of k would be k=m/v. In such a case, a main memory block number "j" can be placed in a set "i" based on the equation, i=j modulo v.

Improvements in cache memory performance have been sought using various methods of linking and associating groups of cache lines so as to form a policy that is configured to decide where in the cache a copy of a particular entry of main memory will go. If the policy is free to choose any entry in the cache to hold the copy, the cache is called "fully associative." At the other extreme, if each entry in main memory can go in just one place in the cache, the cache is called "direct mapped." Many caches implement a compromise in which each entry in main memory can go to any one of N places in the cache, and are described as "N-way set associative." For instance, in a 2-way set associative, any particular location in main memory can be cached in either of 2 locations in a data cache. Similarly, in a 4-way set associative, any particular location in main memory can be cached in either of 4 locations in a data cache. Multiple algorithms can be used for determining the location in which the data block can be stored.

A cache miss refers to a failed attempt to read or write a piece of data in the cache, which results in a main memory access with much longer latency. Lowering the cache miss rate is a major area of focus. Therefore, a significant amount of analysis has been done on cache behavior in an attempt to find the best combination of size, associativity, block size, and so on. There can be multiple kinds of cache misses, which can impact the cache and processing performance in different ways. For instance, compulsory misses are those misses that are caused by the first reference to a location in memory. Cache size and associativity make no difference to the number of compulsory misses but prefetching data can help here, as can larger cache block sizes. Capacity misses are those misses that occur regardless of associativity or block size of the cache memory, solely due to the finite size of the cache. Conflict misses, on the other hand, are misses that could have been avoided had the cache not evicted an entry earlier. Conflict misses can be further broken down into mapping misses, that are unavoidable given a particular amount of associativity, and replacement misses, which are due to the particular victim choice of the policy (e.g., such as a replacement policy). The replacement policy, particularly for multi-level cache systems, is chosen based on cache coherency protocol and inclusion policies used by the cache systems.

As shown in FIG. 1(b), processors in multi-level cache systems have multiple levels of caches, viz. caches L1, L2, L3, and L4. Further, as shown in architecture 300 of the multi-level cache system in FIG. 3(a), multiple processors may be configured to access data/blocks from the same caches. Such multi-level caches may be implemented in System-on-Chip (SoC) or Network-on-Chip (NoC), for example. In SoCs or NoCs, multiple processing elements may be arranged in multiple layers connected through bridges or interconnects. For example, multiple processing elements, such as Central Processing Unit (CPU) 302-1, 302-2, aside from having corresponding L1 cache 304-1, 304-2 and L2 cache 306-1, 306-2, are configured to the higher-level L3 cache 308-1. The L3 cache 308-1 can be configured to exchange data directly with memory 314, or through an L4 cache 312. The L4 cache 312 can also be configured to exchange data with L3 cache 308-2, which in turn is connected to caches in devices 310-1, 310-2 that form a network 311 of cores (such as cores 310-1, 310-2), agents, processors, or any combination thereof. In the example shown in FIG. 3(a), the processor may be a dual core processor 301, although the processor may have any number of cores. Further, the architecture 300 shows a fabric of caches, where clusters of caches at each level (such as L3 caches 308-1, 308-2) are maintained. In some implementations, caches (such as L3 caches 308-1, 308-2) may have corresponding snoop filters 309-1, 309-2, respectively, configured to snoop transactions from the shared bus or interconnection unit, and filter those transactions that require state of cache lines in caches associated therewith. In other implementations, the snoop filters may be configured to track cache lines stored in one or more caches, such as caches 316-1, 316-2, 316-3, and 316-4 (hereinafter collectively referred to as caches 316), as shown in architecture 350 of FIG. 3(b). However, the snoop filters may also be implemented in other caches or as a standalone device on the shared bus/interconnection units.

Multi-processor systems/chips must maintain coherency across their caches, i.e. consistency of data in cache lines having tags pointing to the same address in the memory. Cache coherency protocols seek to ensure coherency between caches at the same level, as well as coherency across the fabric. Changes made to the data are propagated to all other copies thereof in each level of cache in the order that they are made. To maintain coherency horizontally and vertically on all levels of caches, the caches are configured to notify/make visible any modifications made to the data to all other caches and the memory.

A coherency protocol is a set of mechanisms to maintain coherence between the caches in the system. Cache coherency can be performed by instructions executing on a processor that explicitly writes data back from memory to make it visible to other caches. Other approaches for cache coherency include hardware managed cache coherency, where a set of (finite) state machines remove dirty (modified) cache lines and write the data therein back into memory. The state machines define the states of the cache lines in the system, conditions and transition between the states and operations and communications performed during coherent read and write requests.

Coherency of caches can be ensured using snoop-based or directory-based coherency protocols. Typically, caches would maintain a state for each of its cache lines, using finite state machines. The state of the cache lines is shifted when a bus transaction is transmitted/broadcasted through a shared bus or interconnection unit that connects the caches with each other, and the memory. Examples of bus transactions include read requests for reading the data in the memory into a cache line, write requests for writing dirty data/modified data to the memory (during write-back or write-through respectively), etc. Each of the caches uses a corresponding coherency controller, such as those including a snoop filter, to snoop and monitor all transactions taking place on the shared bus.

The coherency controller/snoop filters read the tags for which the transactions are being made, determine whether the corresponding cache includes the tags associated with the bus transaction, and make corresponding changes to the state of the cache lines based on the transactions transmitted through the shared bus/interconnection unit. The snoop filter may change the state of cache lines in all lower-level caches. These coherency protocols ensure that modifications to a cache, or cache line thereof, are propagated to other copies of the cache line in the serial order in which they are made. Further, such protocols typically aim to allow only one cache to have permission to write/modify the data, and prevent other caches from having stale copies (unmodified copies) of the data.

In typical valid/invalid coherency protocols, the caches are initialized to an invalid state, and may move to the valid state when the data from the memory is read into one of its cache lines. If the cache line is modified, the cache may transmit a write request (along with a tag associated with the modified data) to the memory, and broadcast the write request to other caches through the shared bus. The other caches may then read the write request using their corresponding snoop filters, and invalidate the cache lines having the tag provided in the write request. Alternatively, a directory-based cache coherence protocols can be used in place of the snoop-based protocols, where the cache line addresses being shared by agents in the system are tracked in a common directory that maintains the coherence information between agent caches. The directory acts as a filter through which the processor must ask permission to load data/blocks from the primary memory to its cache. When the cache line is changed/modified, the directory either updates or invalidates the other cache lines having the same tag.

Other coherency protocols, such as MESI or MOESI protocols, have been proposed that minimize the number of transactions or broadcasts made through the shared bus. In MESI and MOESI protocols, the states that the cache lines could be in include a "M" (modified) state, a "S" (shared) state, an "I" (invalid) state, an "O" (owned) state, and an "E" (exclusive) state.

In an invalid state, the cache line may have an invalid copy of the referred data (also interchangeably referred to as block), or no data at all. In an exclusive state, only one of the caches has read the data from the memory thereinto. Cache lines in exclusive state may be readily switched to either the shared state or the modified state. In a shared state, copies of the cache line storing the data may be present in two or more caches. In an owned state, the cache lines may have an exclusive right to modify the data and write it back to a higher-level of cache or the memory. While the data may be read into other cache lines, only the cache lines with an owned state may modifiable and written back to the memory. A modified state may indicate that the data in the cache line has been modified, or that the data in the cache line is "dirty." To shift the cache line to the modified state, an exclusive read request may be broadcasted on the shared bus to invalidate other copies of the cache line in the other caches, thereby providing exclusive permission to the cache line in the modified state to modify the data.

Initially, all cache lines are in an invalid state. If a first processor reads data from the memory, it may store the data in a first cache line of a first cache. The state of the first cache line may be set to an exclusive state. The first cache line may move to a shared state if the data was read and stored in a second cache line in a second cache of a second processor before or after the first processor reads and stores the data in the first cache. The first and second caches may transmit bus read requests through the shared bus, which are monitored by other caches to modify states of their cache lines.

If the first processor modifies the data in the first cache line, the first cache broadcasts an exclusive read request through the shared bus. In such instances, the first cache shifts the state of the first cache line to the modified state, and the second cache shifts the state of the second cache line to the invalid state in response to the broadcast. If the second processor subsequently modifies or needs to retrieve the data from the second cache, the second cache may broadcast the read (exclusive) request, and shift the state of the second cache line to the modified state. Since the first cache line is also in the modified state, the first cache broadcasts a bus write request to write the data into the memory, which is then read by the second cache. The first cache line may then be shifted to either the invalid state or the shared state based on whether the second cache transmits a bus read exclusive request or a bus read request, respectively, thereby ensuring that the changes to the data are propagated across all the caches in the order they are made.

When the cache lines are in the exclusive state, implying that the data is stored in only one cache, the cache may not require a write request to be broadcasted during write-through or write-back. In such instances, broadcasting the write request can be avoided since cache lines in other caches having the corresponding data/block are initialized to be invalid, and hence do not require any change in their states. Avoiding the broadcast of the write request improves efficiency of the cache.

The snoop filters track a set of sharer vectors that indicate which caches have the cache lines associated with an address tag. Sharer vectors may be any a one-hot bit encoding of each of bits associated with each of the processing elements. Snoop filters may store the tags associated with blocks stored in the cache lines under the hierarchy of the snoop filter, and may also store states associated with each of the cache lines. Directory-based structures may be maintained within the snoop filter to store the address tags and the state of cache lines. Further, the snoop filter also maintains a list of sharers and/or owners of the cache lines. For instances, if two caches beneath the snoop filter store cache lines in shared states therein, the snoop filter may maintain the list of such "sharer" caches in its directory. The sharer vectors are commonly represented as a list of binary-encoded requester-ids, and stored in set associative caches.

The snoop filter maintains a directory having at least two attributes, viz. an address tag and a state attribute. The address tags may be stored in one or more ways implemented similarly to set-associative caches. The directory may use set-associative structure to store the address tags and the corresponding state of the cache lines. The state attribute may include the state of the cache line identified using the tag. For example, the state attribute may include a sharer attribute that lists the caches that share copies of the cache line, i.e. when multiple caches have copies of the cache line in the "S"/shared state. Similarly, the state attribute may also include an owner attribute indicating whether any of the caches is the owner of the cache, i.e. whether any of the lower-level caches of the snoop filter has a copy of the cache line in the "O"/owned state. Snoop filters may also have to search through the directory to determine if a cache below its hierarchy has a copy of a cache line that requires modification to its state based on the transaction. However, searching through the directory can be significantly less computationally expensive and power efficient as it only stores the tag and list of sharers (and not the blocks which also have to be read/skipped through in a cache).

Typically, the sharer attribute is stored in the form of vectors. The vectors consume a significant number of bits that allow the processing units utilizing the cache line in their corresponding caches to be uniquely identifiable. For example, if the snoop filter is associated with 128 processing elements each having a corresponding cache, the vector may have 128 bits. However, maintaining such large representations for the sharers are inefficient. Use of large vectors necessitates the snoop filter to maintain directories with larger storage capacities, which increases cost. Further, observations in implementation indicate that expected value of number of sharers that a cache line is small (such as around two) in most situations, thereby implying that the space provided by the directory is mostly underutilized in most situations.

Therefore, there is a need for a method and a system for cache coherency in that dynamically determines representation for maintaining the list of sharers or owners based on the number thereof.

SUMMARY

The present disclosure is directed towards operation of snoop filters for cache coherency management.

Aspects of the present disclosure include a method for a snoop filter. The method includes using binary encodings and vector encodings to represent owner and sharers of cache lines of a cache, where the vector encodings can be split across multiple ways of the snoop filter via a vector range identifier and a common address tag, and where only vector ranges having at least one sharer from the sharers are allocated a way from the multiple ways.

Aspects of the present disclosure are also directed towards a cache coherent system. The system includes a cache having cache lines, and a snoop filter. The snoop filter is configured to use binary encodings and vector encodings to represent owner and sharers of the cache lines of the cache, where the vector encodings can be split across multiple ways of the snoop filter via a vector range identifier and a common address tag, and where only vector ranges having at least one sharer from the sharers are allocated a way from the multiple ways.

DETAILED DESCRIPTION

The following detailed description provides further details of the figures and example implementations of the present disclosure. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present disclosure.

Cache coherency controllers, particularly in snoop-based coherency protocols, are configured to read transactions from a shared bus or interconnect units of a processor/chip, and update "state" of cache lines based on the transactions. Since it is computationally expensive to determine if a cache has the cache line subject to a state change based on the transaction, controllers may include snoop filters that are configured to "filter" the transactions that the cache needs to act upon. For example, the snoop filter may determine if the cache line referred to in the transaction is stored in one or more lower-level caches associated with the snoop filter. If the determination is positive, the processing elements, or corresponding caches thereof, may search through its ways and change the state of the cache line therein. If the determination is negative, no action is taken by the processing elements/caches, thereby freeing computational resources and reducing power consumption. Use of snoop filters also alleviate scalability problems associated with caches that maintain coherency using snoop-based coherency protocols. To make the determination, snoop filters are configured to store tags/indices in a directory of the cache lines in lower-level caches associated therewith, i.e. the caches beneath the snoop filter in the hierarchy of multi-processor systems (such as those implementing System-on-Chip (SoC) or Network-on-Chip (NoC) architectures) having a multi-level cache system.

The snoop filter may maintain a directory having tags corresponding to the cache lines stored in the lower-level caches, a "sharers" attribute, and an "owner" attribute. The directory may be structured similarly to a cache 200 having multiple ways. The directory may include a plurality of ways to store the tags and corresponding sharer and owner attributes. The sharer or sharer attribute may correspond to a list of caches or processing elements storing copies of the same cache line, implying that the subject cache line is in "S" or a shared state. The caches or processing elements may be identified using an identifier, such as using (sharer) vectors or binary identifiers. Processing elements and caches sharing/storing copies of the same cache lines may be referred to as "sharers". The owner, or owner attribute may indicate which (if any) of the lower-level cache has the cache line in "O" or owned state. The processing element or cache having cache lines with owned state may be referred to as "owner" of the cache line.

However, as the number of processing elements or components in a processor increases, the size of identifiers/vectors associated therewith may also increase. For example, the number of processing elements or caches may be large in multi-processor systems/chips such that storing the list of sharers using vector encoding requires 128-bits, where each bit is associated with a corresponding processing element or cache. However, maintaining 128 bits may be space and energy inefficient. For example, in situations where only there are only two sharers, snoop filters are still required to store the sharer vectors using 128-bits to accommodate for worst-case scenarios where all processing elements/caches share copies of the cache line, which may be wasteful because practical observations indicate that snoop filters are more likely to store smaller number of sharers (such as two sharers) in most situations. On the other hand, if a high proportion of the cache lines in the multi-processor systems have multiple sharers (such as greater than 2), then 128-bit sharer vectors are more efficiently utilized, and furthermore, the total number of distinct lines that the snoop filter needs to track is low so the snoop filter can have (if appropriately designed) enough space to store such sharer vectors. Hence, there is a need for snoop filters that optimally maintain list of sharers of cache lines in the directory that consumes reduced space when the number of sharers is small, and allow switching to other representations conducive for situations where the number is sharers is large. Further, there is a need for snoop filters that optimally track the owner of a cache line.

The present disclosure describes a system and a method for a snoop filter for performing cache coherency operations. The present disclosure is further directed to a snoop filter configured to switch the type of encodings (through use of binary encodings or vector encodings) used to represent sharers and owner of cache lines based on number of caches sharing copies of the cache lines. The present disclosure further provides for performing capacity evictions and adaptability to skewed hashing.

Figure 3A:
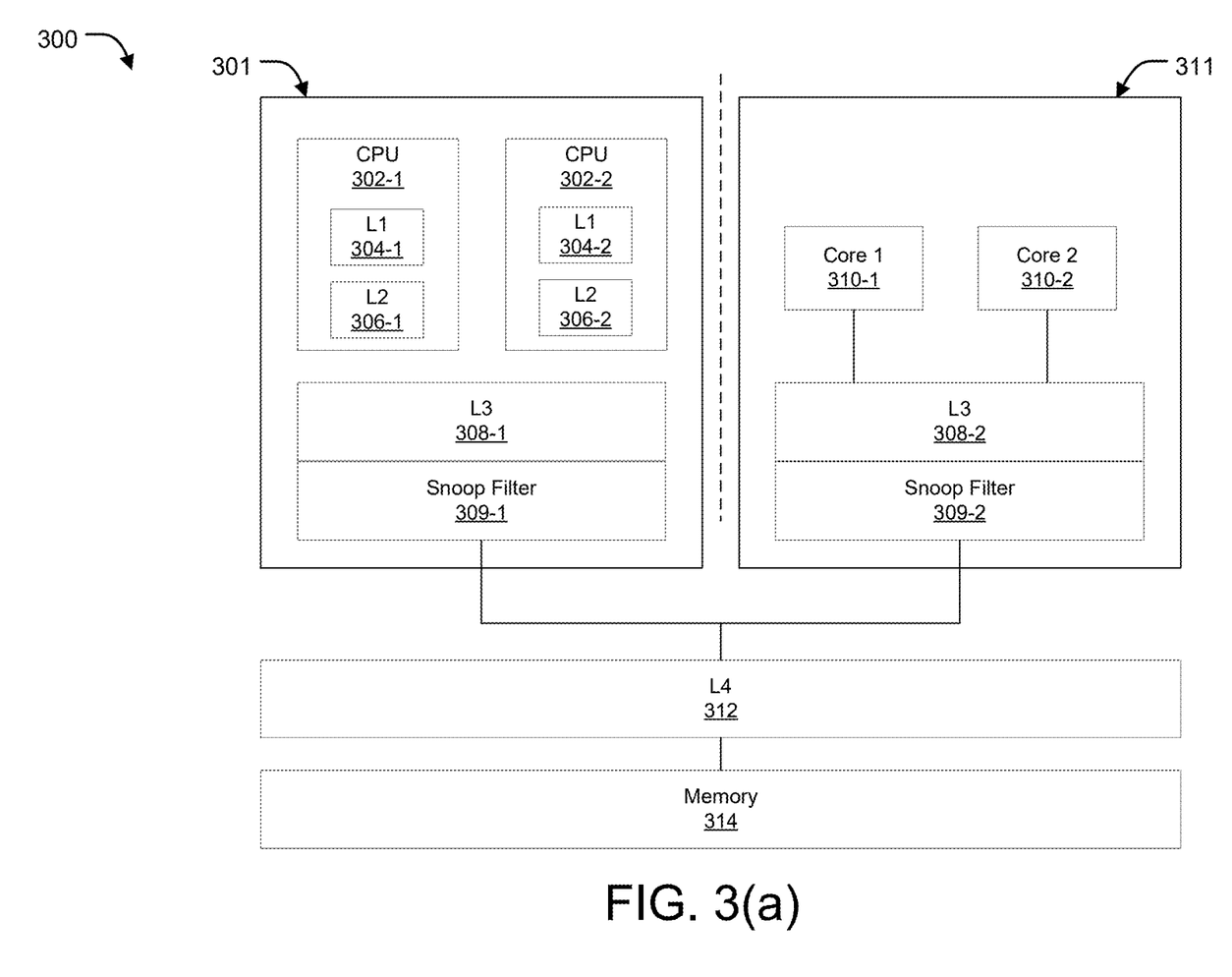
FIG. 3(a) illustrates an example architecture of a multi-level cache system.
Figure 3B:
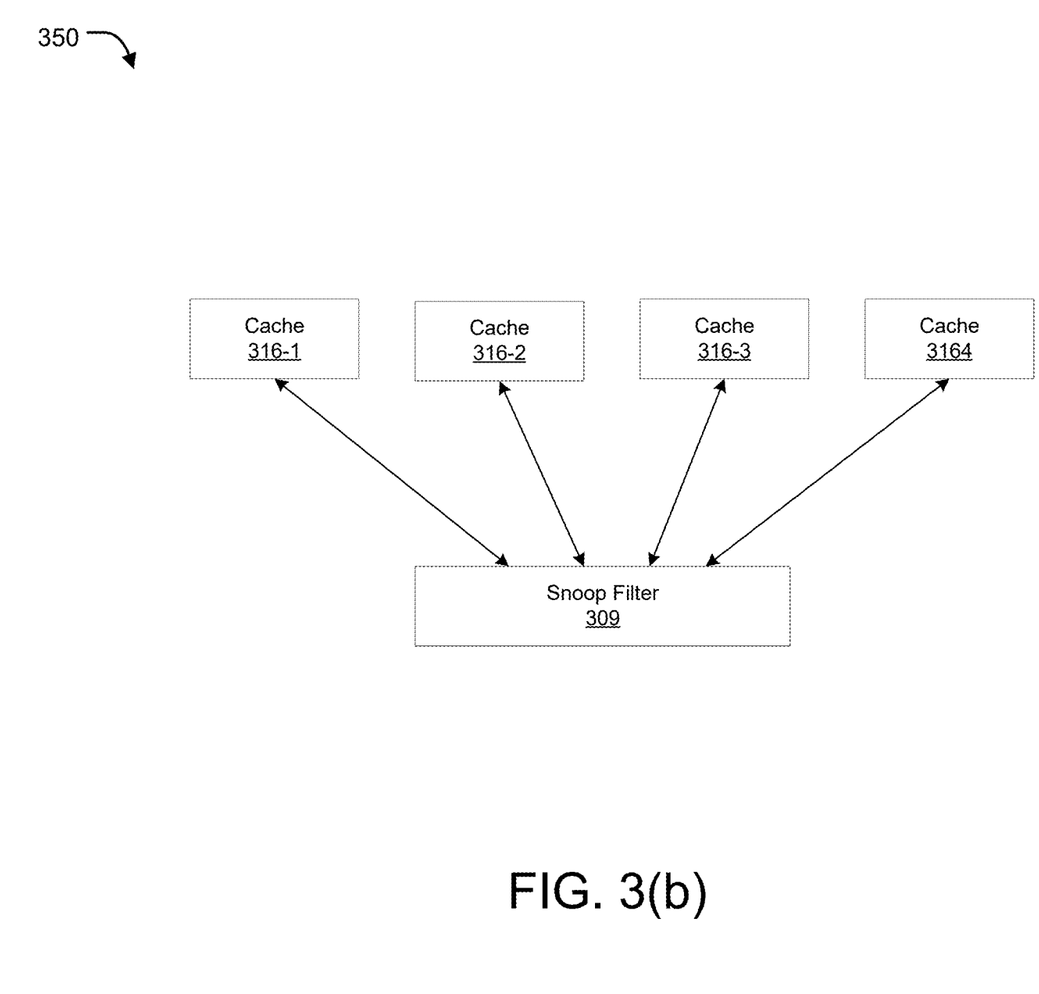
FIG. 3(b) illustrates an example representation of a snoop filter associated with one or more caches.
Figure 4A:
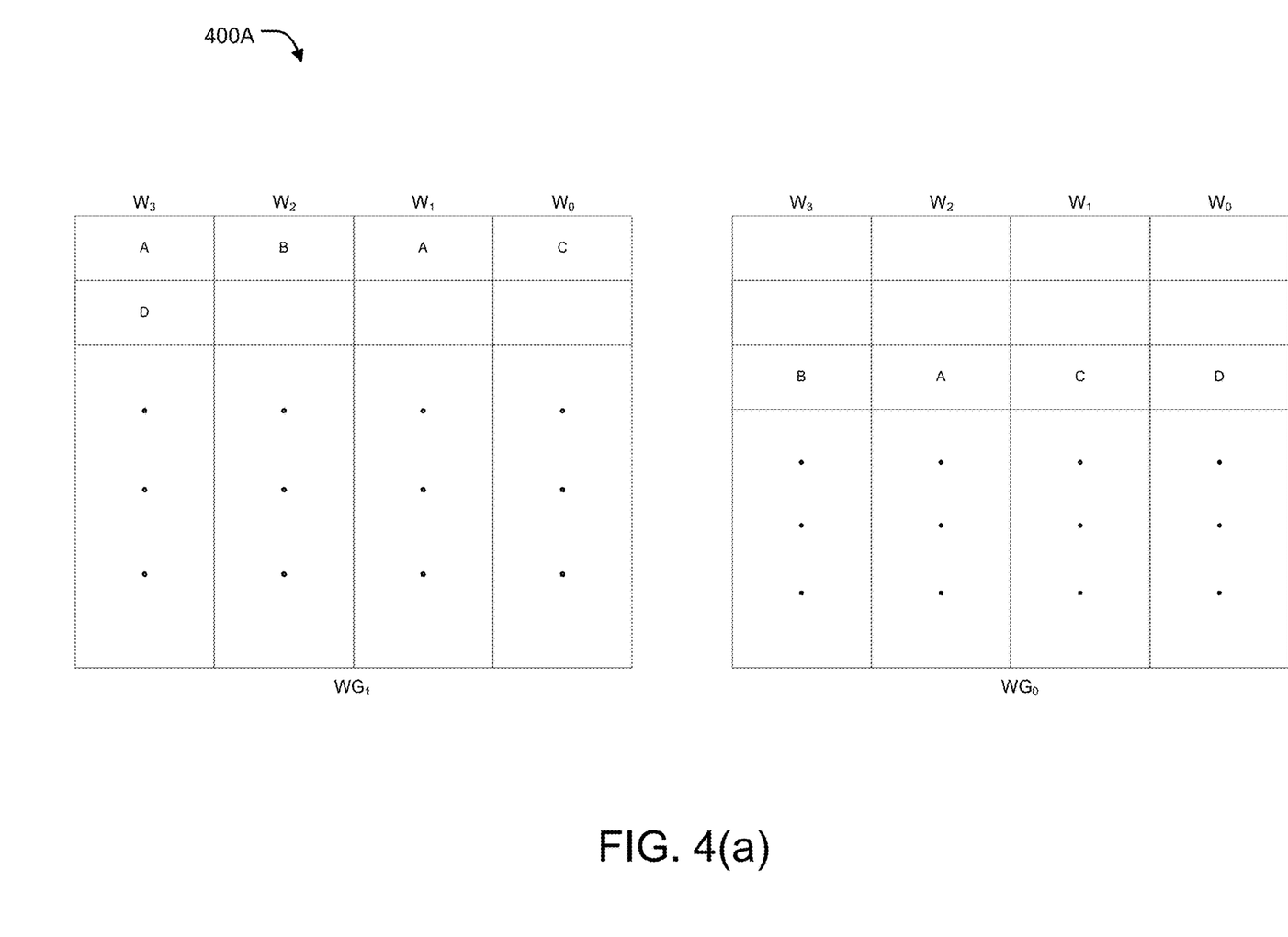
FIG. 4(a) illustrates an example representation of way groups used by the snoop filter, in accordance with embodiments of the present disclosure.

In an aspect, the present disclosure provides a cache coherent system that includes at least one cache and a snoop filter. For example, caches 316 may be tracked by snoop filters 309, as shown in FIG. 3(a) or 3(b), but not limited thereto. In some embodiments, at least one snoop filter may be associated with each cache. In other embodiments, a single snoop filter may be implemented on a shared bus or an interconnection unit wherefrom the snoop filter may be configured to filter snoop transactions for all caches in the multi-cache system/multiprocessor system. The snoop filter may be implemented as a part of a cache coherency controller associated with each of the caches. The directory 400A may be used by the snoop filter to track the sharers and the owner of cache lines.

FIG. 4(a) illustrates an example directory 400A maintained by the snoop filter. The directory 400A may be organized/implemented as an N-way associative cache, similar to the cache 200. As shown, the directory 400A includes a plurality of ways, such as ways $W_0$, $W_1$, $W_2$, and $W_3$. The ways may be grouped into one or more way groups (such as the ways being grouped into way groups $WG_0$ and $WG_1$). Each of the ways may track owners and sharers of one or more cache lines. In some embodiments, each of the cache lines may be replicated in multiple locations on the way groups, thereby allowing sharers to be tracked when one way (or lines therein) is insufficient to track the sharers of the cache line. Each cache line may also be hashed using a hash function to create skewed indices therefor in the way groups. In some examples, the cache lines indicated by A, B, C, and D may be stored either in one or in both way groups $WG_0$ and $WG_1$ in corresponding ways. The way group $WG_1$ may correspond to direct mapping of the cache lines into the ways, while way group $WG_0$ may correspond to hashed indices of the cache lines.

Each of the ways may include one or more lines that store the address tags associated with the cache lines, followed by indications of which cache is the owner, and which caches are sharers of the cache line. As shown in lines 400B and 400C of FIGS. 4(b) and 4(c), each of the lines 400B, 400C may include the address tag of cache line 'X' indicated by $Tag_x$, a type attribute indicating the type of encoding used, the owner attribute indicates an identifier associated with the owner, and the sharer attribute indicating the sharers of the cache line.

Figure 4B:
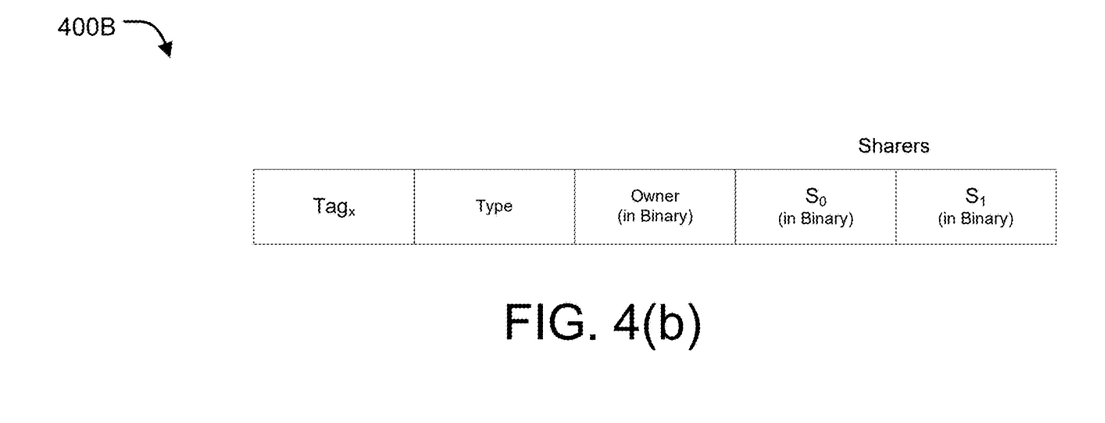
FIG. 4(b) illustrates an example representation of a way using binary encoding, in accordance with embodiments of the present disclosure.
Figure 4C:
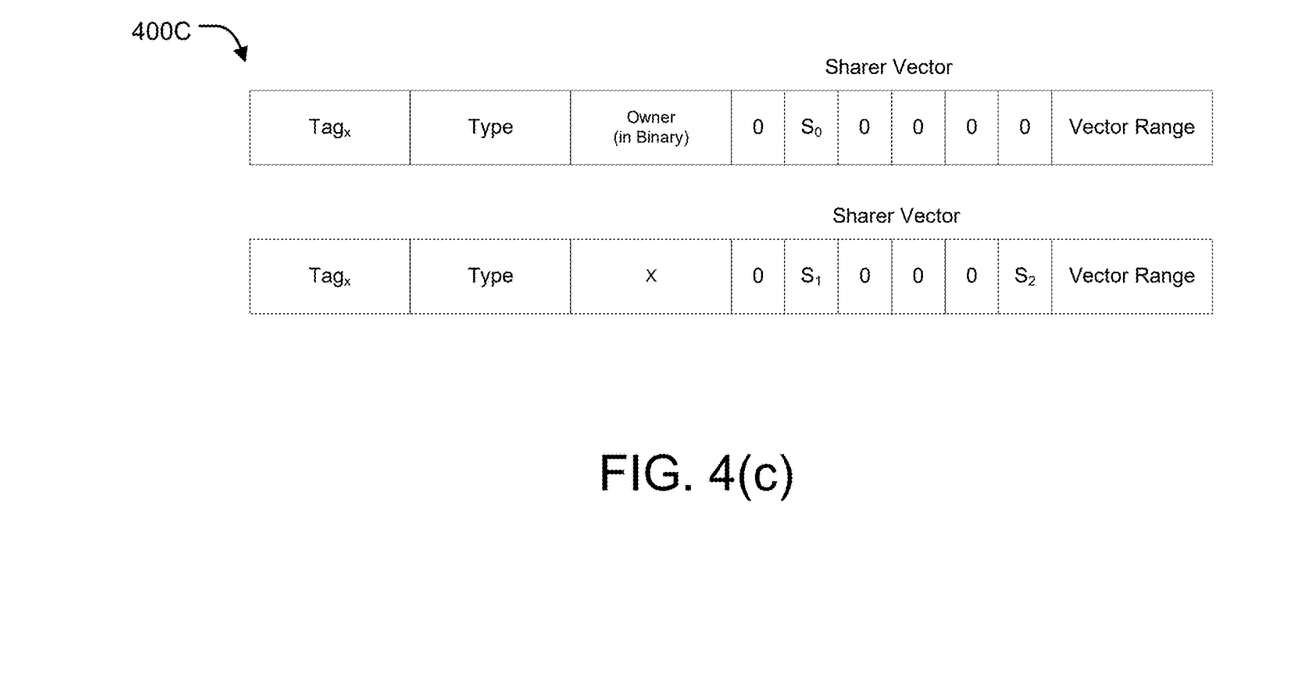
FIG. 4(c) illustrates an example representation of the way using binary encoding and vector encoding, in accordance with embodiments of the present disclosure.

The snoop filter may be configured to use binary encodings for the owners, and either binary encoding or vector encodings to represent the sharers of cache lines of the cache. The line 400B shows both the owner and the sharers (viz. $S_0$ and $S_1$) being represented using binary encoding, and the two lines 400C show the owner being represented using binary encoding, and the sharers (viz. $S_0$, $S_1$ and $S_2$) being represented using vector encoding. The type of encoding used to represent the sharers may depend on the number of sharers (i.e. number of caches having copies of the cache line). In some embodiments, when using binary encoding, the length/width of the binary identifier (ID) may depend on the maximum number of sharers in the system. Each binary ID may correspond to one of the processing elements or corresponding caches thereof. For example, when the binary value is 00, the cache line is owned or shared by the processing element or cache with ID 0, and when the binary value is 11, the cache line is owned or shared by the processing element or cache thereof with ID 3. As shown in FIGS. 4(b) and 4(c), $S_0$, $S_1$ can be in the same positions as the vector range allows the example implementations to change the meaning of the sharing vector bits to facilitate the desired implementation.

In some embodiments, the snoop filter may be configured to use a binary encoding when the number of processing elements currently being tracked is small, or less than a predetermined threshold. For example, if the predetermined threshold is 3, the snoop filter may use an array of 3 binary encodings to represent the owner and up to 2 sharers. If the snoop filter is configured to track four processing elements, then each entry includes two bits, allowing an array of 6 bits to track the owner and up to two sharers. When there are less than 2 sharers, the binary encoding of the owner's ID can be used to indicate that no sharer is present in that entry. When the number of processing elements sharing the cache line increases to a number greater than the predetermined threshold, the snoop filter may be configured to use vector encodings to represent said processing elements, thereby 'expanding' the encodings. The snoop filter may transition from a binary encoding (for both owner and the sharers) to a mixed binary and vector encoding (where owners are represented using binary encoding and the sharers are represented using vector encoding) when the number of sharers exceeds a binary encoding format capacity. The binary encoding format capacity may depend on the number of bits used in the way. For example, if the number of processing elements (now sharers) sharing the cache line associated with a common address tag increases to a number greater than 3 (or the predetermined threshold), the snoop filter may be configured to track the sharers using vector encodings.

When the snoop filter switches to use vector encodings to represent the sharers, the space available for such representations may be insufficient in some situations. For example, the directory 400A may allocate 8 bits for tracking two sharers among a total of 16 sharers, when using the binary encoding (i.e. when each 4-bit ID indicates presence of cache line in the corresponding processing element), as illustrated in the lines 400B. When the number of processing elements sharing the cache line increases to a number greater than two (such as to 3), the directory 400A may not be able to indicate presence of cache lines using binary encoding as only 8-bits are available, and binary IDs for 3 sharers would need 12-bits. In such embodiments, the snoop filter may be configured to expand the vector encodings, i.e. switch from binary encoding to vector encoding, to represent the sharers a shown in lines 400C. For using vector encoding, the snoop filter may partition/allocate/bin the sharers into one or more vector ranges/range groups (such as into four range groups represented by two bits in the forgoing example). In such examples, if number of processing elements (or caches thereof) tracked by the snoop filter is 128 (numbered 0 to 127), vector range/range group with value '00' formed by the two bits may correspond to processing elements 0 to 31, range group with value '01' may correspond to processing elements 32 to 63, range group with value '10' may correspond to processing elements 64 to 95, and range group with value '11' may correspond to processing elements 96 to 127. The number bits allocated/used in each entry/line of the ways in the directory 400A when using the binary encoding or the vector encoding, respectively, may be optimized for maximizing cache line hits while minimizing space required/allocated therefor in the directory 400A. In other embodiments, the vector representing the sharers may be contracted (i.e. switching from vector representation to binary representation), when the number of sharers decreases to a number below the predetermined threshold.

In some embodiments, the binary encodings may be utilized to represent the owner associated with one or more of the sharers. In such embodiments, both the owner and the sharer may be represented using binary encoding, as shown in the line 400B. In other embodiments, the vector encodings are utilized to represent one or more of the sharers. In such embodiments, the owner (if it exists) is represented using binary encoding, and the sharers are represented using vector encoding, as shown in the lines 400C. Multiple lines may be required to represent trackers in each vector range/range group. The type attribute may be used to indicate whether sharers of the cache lines are represented using binary encoding or vector encodings. While the examples illustrated in FIGS. 4(b) and 4(c) depict the lines 400B, 400C including entries having a first set of bits representing the tag/address associated with a cache line, followed by a second set of bits indicating the type attribute, a third set of bits indicating the owner attribute, and a fourth set of bits indicating the sharer attribute (i.e. either in binary or vector encodings of the sharer), it may be appreciated by those skilled in the art that the order of the attributes is not limited thereto, and that each entry may be suitably adapted/reordered based on requirements.

As stated, the directory 400A may have one or more ways, and the ways may be arranged in one or more way groups (such as $WG_0$ and $WG_1$). In some embodiments, each of the way may correspond/belong to a vector range identifier, where the processing elements are allocated range group serially based on an identifier thereof. Each range group may be allocated at least one way or a way group based on identifiers of the processing elements. In some embodiments, the snoop filter may be configured to manage skewed hashing across way groups. Skewed hashing may reduce conflicts by using a hash function to determine which set in a second way group can hold the sharers/owners of a cache line. When using skewed hashing, the set in each way group may be shared with different lines, improving cache efficiency. In some embodiments, the ways/way groups may be configured to store tags and corresponding sharers and owner attributes using a set associative architecture. This means that the directory information of a single cache line may be split between the way groups and require coordination between them that would be otherwise unneeded.

In some embodiments, the vector encodings of the sharers may be split across any subset of the multiple ways of the cache via the vector range identifier and the common tag. In such embodiments, the vector encodings may be larger than the size of a single way. Such embodiments may indicate situations where the more than one of the ways have the sharers. To store the vector encodings, the vector encodings may be split across multiple ways. Each of the multiple ways may store a unique vector range identifier therein. For example, if the sharers are present in ranges indicated by '00', and '01', a first way may store sharers in the first vector range/range group '00' and a second way may store sharers in the second vector range/range group '01'. The first and second way may belong to the same or different way groups. Both the first way and the second way may store the vector encoding using the same/common address tag. Further, in some embodiments, only vector ranges having at least one sharer from the sharers may be allocated a way from the multiple ways. By only allocating ways for vector ranges that have copies of the sharer, the space in the directory may be optimally utilized. Once the vector encoding is split, the vector encoding may be identifiable using the common tag.

In some embodiments, the snoop filter may also be configured to perform a capacity eviction when a new sharer for an existing cache line is added. Normally, a snoop filter performs capacity evictions when all ways of a set in the directory 400A are full and a new line needs to be tracked. When the number of sharers associated with a tag increases to a number greater than the predetermined threshold, this can cause the snoop filter to need more storage to represent the sharers associated with said address tag. Performing capacity evictions is one way to make additional ways available. In some examples, said conversion may involve the switch from binary encoding to vector encoding to represent the increased number of sharers, which in-turn occupies more storage. For example, if the number of sharers increases from one to two, and if the sharers belong to different vector range/range groups identifiers (associated with different ways), then directory 400A may have to store vector encodings for each vector range/range group in multiple ways. However, if all ways are full/occupied, the snoop filter may perform capacity evictions to reclaim a way and store the expanded vector encodings therein. In some embodiments, to perform capacity evictions, the snoop filter may be configured to execute a partial eviction process, by selecting a way from the multiple ways of the directory 400A, and partially evicting sharers associated with the line to reclaim the way. In some embodiments, to select a way, any selection policy or replacement policy (such as least recently used (LRU) policy, least frequently used (LFU) policy, or a combination thereof, but not limited thereto) may be used. In some examples, if a common tag is stored in multiple ways due to sharers being split across multiple vector ranges, the snoop filter may be configured to select the ways tracking sharers associated with one of the vector range identifiers. In such examples, the snoop filter may "partially" evict sharers in the selected way, i.e. evict sharers belonging to a subset of vector range identifiers. In some embodiments, on eviction of the tags from the directory 400A, the snoop filter may cause corresponding cache lines in the lower-level caches/processing elements to be evicted through back invalidation snoops. The reclaimed way may be used for storing the new vector encodings obtained by converting the binary encoding of the address tag. In some embodiments, (partial) evictions may also be performed when new address tags are to be tracked by the snoop filter.

By dynamically switching between binary encodings and vector encodings to represent the sharers and the owner of cache lines, the snoop filter of the present disclosure eliminates the need for maintaining large ways in the directory 400A of the snoop filter. Hence, the present disclosure allows the directory 400A to be constructed with smaller ways in comparison to existing art, thereby providing savings in terms of space and cost. Further, the snoop filter of the present disclosure promotes optimal utilization of the directory 400A by maintaining an optimal number of sharers, and evicting sharers when their number exceeds a threshold, thereby ensuring that the directory 400A accommodates/tracks sharers and the owner of a greater number of unique cache lines.

In another aspect, the present disclosure also relates to a method for a snoop filter. The method includes using binary encodings and vector encodings to represent owner and sharers of cache lines of a cache. The vector encodings can be split across any subset of the multiple ways of the cache via a vector range identifier and a common tag. Further, only vector ranges having at least one sharer from the sharers are allocated a way from the multiple ways. In some embodiments, the binary encodings are utilized to represent an owner associated with a single sharer from the sharers. In other embodiments, the vector encodings are utilized to represent multiple ones of the sharers.

The method may further include, for performing a capacity eviction, executing a partial eviction process. For executing the partial eviction, the method may include selecting a way from the multiple ways and partially evicting sharers associated with the way to reclaim the way. In some embodiments, the method may also include transitions from a binary encoding to a mixed binary and vector encoding when the number of sharers exceeds a binary encoding format capacity.

Figure 5:
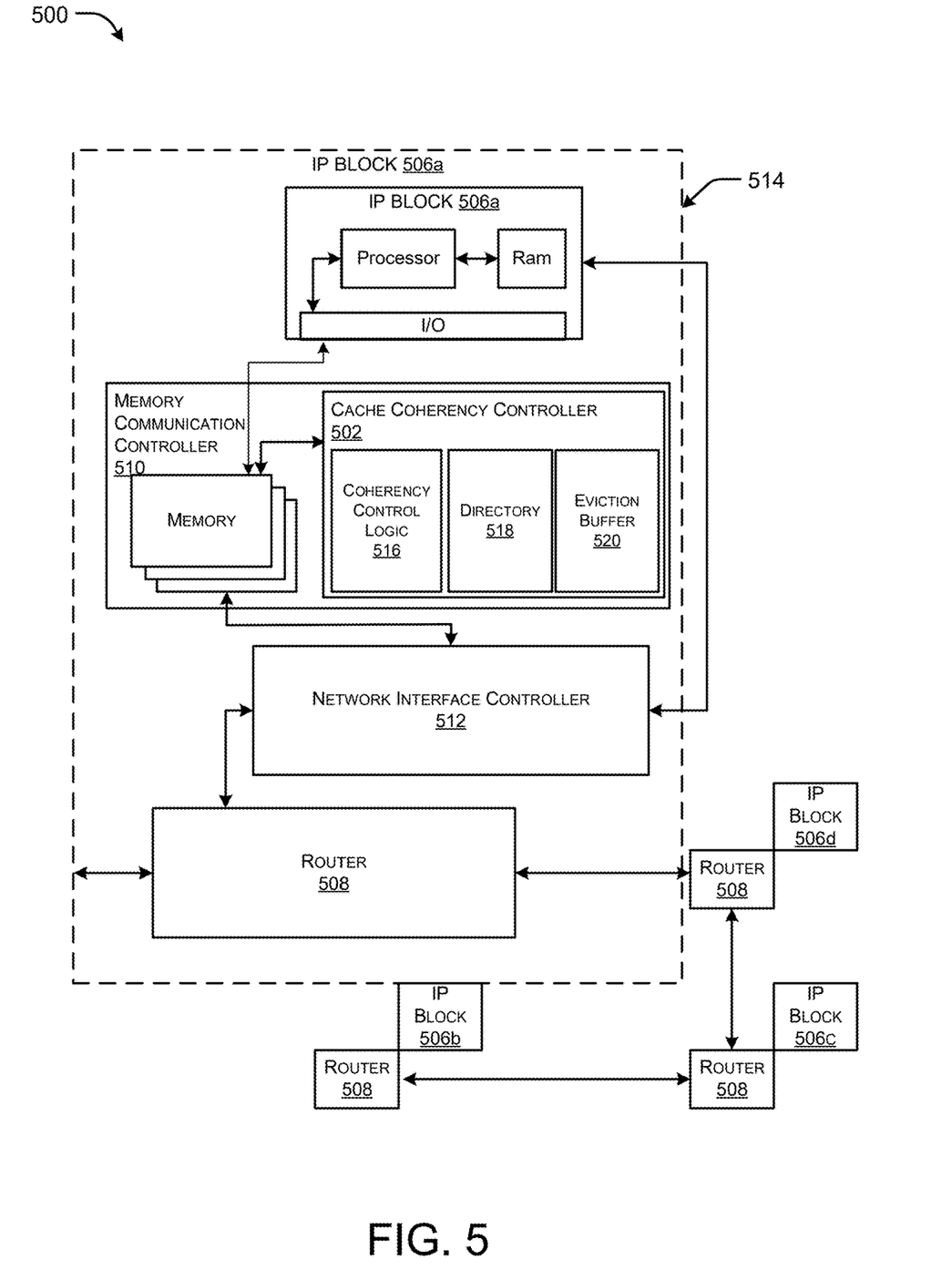
FIG. 5 illustrates an exemplary architecture block diagram of a NoC showing a cache coherency controller in accordance with embodiments of the present disclosure.

FIG. 5 illustrates an exemplary architecture block diagram of a cache coherent system 500 showing a cache coherency controller 502 in accordance with an embodiment of the present disclosure. Although the present representation/illustration of system 500 has been shown with reference to Network-in-Chip (NoC) architecture, one should appreciate that NoC is merely exemplary and the same does not limited the scope of the present disclosure in any manner. As shown, controller 502 of the present disclosure may be configured to be a part of memory communication controller 510 and execute a memory access instruction, and configured to determine a state of a cache line addressed by the memory access instruction, the state of the cache line being one of owned, shared, exclusive, or invalid. Such a memory communications controller 510 may also configured to broadcast an invalidate command to a plurality of integrated processor (IP) blocks or cores of the NoC if the state of the cache line is shared and transmit an invalidate command only to an IP block that controls a cache where the cache line is stored if the state of the cache line is exclusive.

In one aspect, cache coherent system 500 of the present disclosure includes a plurality of IP blocks such as 506a, 506b, and 506c (collectively referred to as IP blocks 506 hereinafter), one or more routers 508, one or more memory communications controllers 510, and one or more network interface controllers 512. In an example embodiment, each IP block 506 can be adapted to a router 508 through a memory communications controller 510 and a network interface controller 512. Each memory communications controller 510 controls communications between an IP block 506 and memory, and each network interface controller 512 controls inter-IP block communications through routers 508. In the example of FIG. 5, one set 514 of an IP block 506a adapted to the routers 508 through the memory communications controller 510 and the network interface controller 512 is expanded to aid a more detailed explanation of their structure and operations. All the IP blocks, memory communications controllers, network interface controllers, and routers in the example of FIG. 5 can be configured in the same manner as the expanded set 514.

In the example of FIG. 5, memory communications controller 510 of the set 514 can include the cache coherency controller 502 with coherency control logic 516 capable of retrieving cache line state from a cache coherency directory 518. In an example implementation, coherency control logic 516 can be configured to implement the cache coherent system of the present disclosure, where the controller 502 can be configured to manage the coherency directory 518 including a plurality of entries/lines. Each entry includes a data line and a share state indicative of a list of shared agents/sharers in the cache coherent system of the data line. The share state may also indicative of a potentially dirty one of the shared agents/sharers.

In an implementation, the controller 502 may be configured to use binary encodings and vector encodings to represent owner and sharers of the cache lines of the cache. The controller may be configured to expand the vector representing the list of sharers when the number of sharers increases to a number greater than a predetermined threshold. The vector encodings can be split across any subset of the multiple ways of the cache via a vector range identifier and a common tag. Only vector ranges having at least one sharer from the sharers are allocated a way from the multiple ways. Conversely, the vector representing the sharers may be contracted (i.e. from vector representation to binary representation), when the number of sharers decreases to a number below the predetermined threshold.

These algorithmic descriptions and symbolic representations are the means used by those skilled in the data processing arts to most effectively convey the essence of their innovations to others skilled in the art. An algorithm is a series of defined operations leading to a desired end state or result. In the example implementations, the operations carried out require physical manipulations of tangible quantities for achieving a tangible result.

Moreover, other implementations of the present disclosure will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method for encoding owner and sharers of a cache line within ways of a directory of a snoop filter, comprising:
   using a single way for the encoding for when available bits in the single way of the directory is sufficient to represent the encoding of the owners and the shares of the cache line; and
   using multiple ways of the directory all stored with a same address tag and vector range identifiers for the encoding for when the available bits in the single way of the directory is insufficient to represent the encoding of the owners and the sharers.

2. The method of claim 1, wherein binary encodings are utilized to encode the owner.

3. The method of claim 1, wherein vector encodings are utilized to encode the sharers using the multiple ways.

4. The method of claim 1, further comprising, to perform a capacity eviction, executing a partial eviction process comprising selecting a way from the multiple ways and partially evicting sharers associated with the way to reclaim the way.

5. The method of claim 1, wherein the snoop filter transitions from a binary encoding to a mixed binary and vector encoding when the number of sharers exceeds a binary encoding format capacity.

6. A cache coherent system, comprising:
   a snoop filter, configured to:
      maintain a directory for encoding owner and sharers of a cache line within ways of the directory;
      use a single way for the encoding for when available bits in the single way of the directory is sufficient to represent the encoding of the owners and the shares of the cache line; and
      use multiple ways of the directory all stored with a same address tag and vector range identifiers for the encoding for when the available bits in the single way of the directory is insufficient to represent the encoding of the owners and the sharers.

7. The cache coherent system of claim 6, wherein binary encodings are utilized to encode the owner.

8. The cache coherent system of claim 6, wherein vector encodings are utilized to encode the sharers through use of the multiple ways.

9. The cache coherent system of claim 6, wherein the snoop filter is configured to, to perform a capacity eviction, execute a partial eviction process comprising selecting a way from the multiple ways and partially evicting sharers associated with the way to reclaim the way.

10. The cache coherent system of claim 6, wherein the snoop filter transitions from a binary encoding to a mixed binary and vector encoding when the number of sharers exceeds a binary encoding format capacity.

* * * * *